United States Patent
Michalewich et al.

(10) Patent No.: US 12,102,882 B1
(45) Date of Patent: Oct. 1, 2024

(54) GOLF BALL COMPONENTS FORMED FROM BIO-BASED POLYUREHANE AND/OR POLYUREA COMPOSITIONS

(71) Applicant: Acushnet Company, Fairhaven, MA (US)

(72) Inventors: Michael Michalewich, Norton, MA (US); Shawn Ricci, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 2 days.

(21) Appl. No.: 18/139,045

(22) Filed: Apr. 25, 2023

(51) Int. Cl.
*A63B 37/12* (2006.01)
*A63B 37/00* (2006.01)
*C08G 18/44* (2006.01)
*C08G 18/72* (2006.01)

(52) U.S. Cl.
CPC ........ *A63B 37/0023* (2013.01); *A63B 37/005* (2013.01); *C08G 18/44* (2013.01); *C08G 18/728* (2013.01)

(58) Field of Classification Search
CPC .................................................. A63B 37/0023
See application file for complete search history.

(56) References Cited

U.S. PATENT DOCUMENTS

| | | | |
|---|---|---|---|
| 5,006,297 A | 4/1991 | Brown et al. | |
| 5,334,673 A | 8/1994 | Wu | |
| 6,100,361 A * | 8/2000 | Keller .................. | C09D 175/06 528/65 |
| 6,132,324 A | 10/2000 | Hebert et al. | |
| 6,309,313 B1 * | 10/2001 | Peter .................. | C08G 18/4804 473/378 |
| 6,315,915 B1 | 11/2001 | Hebert et al. | |
| 6,355,715 B1 * | 3/2002 | Ladd ...................... | C08G 18/10 473/378 |
| 6,458,307 B2 * | 10/2002 | Inoue ...................... | A63B 37/12 264/250 |
| 6,530,849 B2 * | 3/2003 | Peter .................. | C08G 18/4804 473/378 |
| 6,663,507 B1 * | 12/2003 | Watanabe .......... | A63B 37/0031 473/373 |
| 6,677,401 B2 | 1/2004 | Boehm et al. | |
| 6,699,957 B2 * | 3/2004 | Gajewski ............... | C08G 18/12 473/378 |
| 6,702,694 B1 * | 3/2004 | Watanabe ........ | A63B 37/00622 473/371 |
| 6,716,954 B2 * | 4/2004 | Keller .................... | C08L 75/04 473/378 |
| 6,824,476 B2 * | 11/2004 | Sullivan .................. | C08L 23/08 473/374 |
| 6,824,477 B2 * | 11/2004 | Rajagopalan ...... | A63B 37/0024 473/377 |
| 6,958,379 B2 * | 10/2005 | Wu ........................ | A63B 37/12 528/68 |
| 6,964,621 B2 * | 11/2005 | Bulpett .................. | A63B 37/12 473/378 |
| 6,992,135 B2 | 1/2006 | Boehm et al. | |
| 7,067,081 B2 * | 6/2006 | Simonutti .......... | A63B 37/0031 264/328.6 |
| 7,378,483 B2 * | 5/2008 | Wu .................... | A63B 37/0049 528/68 |
| 7,628,714 B2 * | 12/2009 | Tarao ..................... | B29C 35/02 473/378 |
| 8,211,976 B2 * | 7/2012 | Kim ....................... | C08G 18/10 473/378 |
| 8,758,167 B2 * | 6/2014 | Morgan ........... | A63B 37/00621 473/371 |
| 8,829,148 B2 * | 9/2014 | Petrichko ............... | C08G 18/69 473/378 |
| 8,912,304 B2 * | 12/2014 | Bruggeman ......... | C08G 63/668 525/418 |
| 9,206,280 B2 * | 12/2015 | Petrichko ........... | A63B 37/0074 |
| 10,188,910 B2 * | 1/2019 | Mikura ............. | A63B 37/0063 |
| 11,167,175 B2 * | 11/2021 | Kamino .................. | C09D 7/40 |
| 12,005,318 B1 * | 6/2024 | Michalewich ... | A63B 37/00221 |
| 12,005,319 B1 * | 6/2024 | Michalewich ..... | A63B 37/0027 |
| 2018/0155490 A1 | 6/2018 | Sookraj | |

OTHER PUBLICATIONS

Shuxian Ye et al., "CO2 Derived Biodegradable Polycarbonates: Synthesis, modification and applications", Advanced Industrial and Engineering Polymer Research, 2019, pp. 143-160.
Rajendran, Muthuraj, "Recent Progress in Carbon Dioxide (CO2) as feedstock for Sustainable Materials Development: Co-polymers and Polymer Blends", Polymer, 2018, pp. 1-80.

* cited by examiner

*Primary Examiner* — Alvin A Hunter
(74) *Attorney, Agent, or Firm* — Bradley Arant Boult Cummings LLP

(57) ABSTRACT

Thermoplastic and thermoset compositions for use in golf balls that are formed from bio-based materials and that include urethane linkages, golf ball components formed using such thermoplastic or thermoset compositions, and golf balls including such golf components.

18 Claims, 3 Drawing Sheets

GOLF BALL COMPONENTS FORMED FROM BIO-BASED POLYUREHANE AND/OR POLYUREA COMPOSITIONS

FIELD OF THE INVENTION

The present disclosure relates generally to thermoplastic and thermoset polyurethane compositions that, when used in golf balls, provide a finished golf ball with desirable aerodynamic and environmental characteristics. More particularly, the present disclosure relates to thermoplastic and thermoset compositions that include urethane (and, optionally, urea linkages), golf ball components formed using such thermoplastic or thermoset compositions, and golf balls including such golf components.

BACKGROUND OF THE INVENTION

The performance and/or durability of a golf ball is affected by a variety of factors including the materials, weight, size, dimple pattern, and external shape of the golf ball. Golf ball manufacturers are constantly tweaking the materials and construction of a ball in an effort to make incremental gains in performance and/or durability. In this aspect, most multi-piece, solid golf balls today include at least a solid inner core made of natural or synthetic rubber protected by a single or dual cover. Cover layers may be made of a variety of materials including ethylene acid copolymer ionomers, polyamides, polyesters, polyurethanes, and polyureas.

Thermoplastic and thermoset elastomeric compositions are commonly used in cover layers of a golf ball to achieve certain desired performance characteristics and durability. In fact, thermoplastic and thermoset elastomers allow manufacturers a variety of design options in that generally such elastomers have "rubber-like" qualities without the need for vulcanization, can be processed like thermoplastics, and offer wide ranges of hardness and elasticity. In general, polyurethanes are produced by the reaction of a multifunctional isocyanate (NCO—R—NCO) with a long-chain polyol having terminal hydroxyl groups (OH—OH) in the presence of a catalyst and other additives. The chain length of the polyurethane prepolymer may be extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments (formed by the reaction of the diisocyanate and low molecular weight chain-extending diol) are relatively stiff and immobile. The soft segments (formed by the reaction of the diisocyanate and long chain diol) are relatively flexible and mobile. Because the hard segments are covalently coupled to the soft segments, they inhibit plastic flow of the polymer chains, thus creating elastomeric resiliency.

In this regard, golf ball components formed from compositions including urethane and/or urea linkages are commonly used to form golf balls to achieve desirable resiliency, durability, and performance properties, e.g., spin and COR. Such compositions are either cast using a thermosetting elastomer or injection-molded using a thermoplastic elastomer. Indeed, thermoplastic polyurethanes and polyureas have good processability and may have a feel that is preferred by golfers, whereas thermoset polyurethanes and polyureas may be tougher and more durable than its thermoplastic counterpart.

As a result of the favorable properties, polyurethanes and polyureas are also employed as coating layers for golf balls. For example, a golf ball may include a thin, clear coating layer formed from polyurethane or polyurea. Whether used for structural layers or coating layers, polyurethanes and polyureas used in golf ball manufacturing are generally formed by the reaction between an isocyanate-containing component and an isocyanate-reactive component. The isocyanate-reactive component is typically petroleum-based. Since the dependency on petroleum-based polymers have increased extensively over the years, using polymers that are not petroleum-based are of interest. Such bio-based polymers include natural oil polyols (NOPs). However, since NOPs are derived from vegetable oils, NOPs pose direct competition with food sources. In addition, there are a limited number of naturally occurring vegetable oils (triglycerides) that contain the unreacted hydroxyl group necessary for the reactivity of the polyols. Moreover, many NOPs are chemically similar to the vegetable oils from which they are derived, NOPs are prone to autoxidation of fatty acid chains containing carbon-carbon double bonds, which forms odoriferous, low molecular weight aldehydes, ketones and carboxylic acids. In other words, the NOPs may become rancid and smell. As such, while NOPs may help to reduce the demand on non-renewable fossil fuels, there are disadvantages to using the current NOPs.

Thus, there is a need in the art for improved polyurethane compositions for use in golf balls that are formed from bio-based materials. Indeed, it would be advantageous to have polyurethane compositions for use in golf balls that do not include petroleum-based materials but still possess performance attributes similar to or better than conventional polyurethane and polyurea compositions. In addition, it would be beneficial for the bio-based solutions to not directly compete with food sources. Moreover, if such solutions were to also reduce carbon dioxide emissions, the resulting polyurethane and polyurea compositions would help to reduce global warming. The compositions of the present disclosure provide such solutions.

SUMMARY OF THE INVENTION

The present disclosure relates to a golf ball, including: a core; and a cover disposed on the core, wherein the cover is formed from a composition including a reaction product of an isocyanate-reactive component and an isocyanate-containing component, wherein the isocyanate-reactive product includes a precursor reaction product of at least one oxygen- or nitrogen-containing heterocycle and carbon dioxide. In some embodiments, the isocyanate-reactive component includes about 20 percent to about 100 percent of the precursor reaction product. In other embodiments, the isocyanate-reactive component includes about 40 percent to about 100 percent of the precursor reaction product. In still other embodiments, the isocyanate-reactive component consists essentially of the precursor reaction product. In yet other embodiments, the precursor reaction product includes propylene oxide and carbon dioxide. In one embodiment, the precursor reaction product includes two primary functional hydroxyl groups at each end of a polycarbonate backbone. In some aspects, the reaction product further includes a chain extender. In other aspects, the golf ball includes a layer disposed between the core and the cover. The layer may include an ionomer material.

The present disclosure also relates to a golf ball, including: a core; and a cover, wherein the cover is formed from a composition including a second reaction product of a prepolymer and a chain extender, wherein the composition includes urethane linkages, wherein the prepolymer includes a first reaction product of an isocyanate-reactive component and an isocyanate-containing component, wherein the isocyanate-reactive product includes two primary functional hydroxyl groups at each end of a polycarbonate backbone, and wherein the isocyanate-reactive product is a precursor reaction product of at least one oxygen- or nitrogen-containing heterocycle and carbon dioxide. In some embodiments, the precursor reaction product is formed from the reaction of propylene oxide and carbon dioxide. In other embodiments, the precursor reaction product further includes a catalyst present in an amount sufficient to activate the carbon dioxide. In some aspects, the catalyst may include zinc glutarate, zinc dicarboxylate (ZnGA), ZnGA supported on silicon dioxide (ZnGA-SiO2), ZnGA distributed on the surface of acid-treated montmorillonite (MMT) (ZnGA-MMT), ZnGA supported on a perfluorinated compound containing 7-12 carbons (ZnGA-PFC), ZnGA/ DMAPM, zinc adipate (ZnAA), ZnGA/4,4'methylenebis (N,N-dimethylaniline) (ZnAA/DMAPM), zinc pimelate (ZnPA), or combinations thereof. In other aspects, the catalyst includes zinc phenol hydroxyl complex catalysts, zinc metallophthalocyanine-containing poly (arylene ether sulfone) (Zn-PAE), or combinations thereof.

The present disclosure also relates to a method of forming a golf ball, including the steps of: providing a golf ball sub-assembly including at least one core layer; forming a first reaction product from carbon dioxide and an oxygen- or nitrogen-containing heterocycle, wherein the first reaction product includes a carbonate or amide backbone with primary hydroxyl groups at each end of the backbone; adding an isocyanate-containing component to the first reaction product to form a second reaction product including urethane linkages; and forming a cover disposed about the sub-assembly, the cover including the second reaction product. In some embodiments, the step of forming a first reaction product includes reacting carbon dioxide with an oxygen-containing heterocycle. In other embodiments, the step of forming a first reaction product includes reacting carbon dioxide with a nitrogen-containing heterocycle. In still other embodiments, the step of adding further includes the step of adding a chain extender. In this aspect, the chain extender may be hydroxy-terminated, amine-terminated, or a combination thereof.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
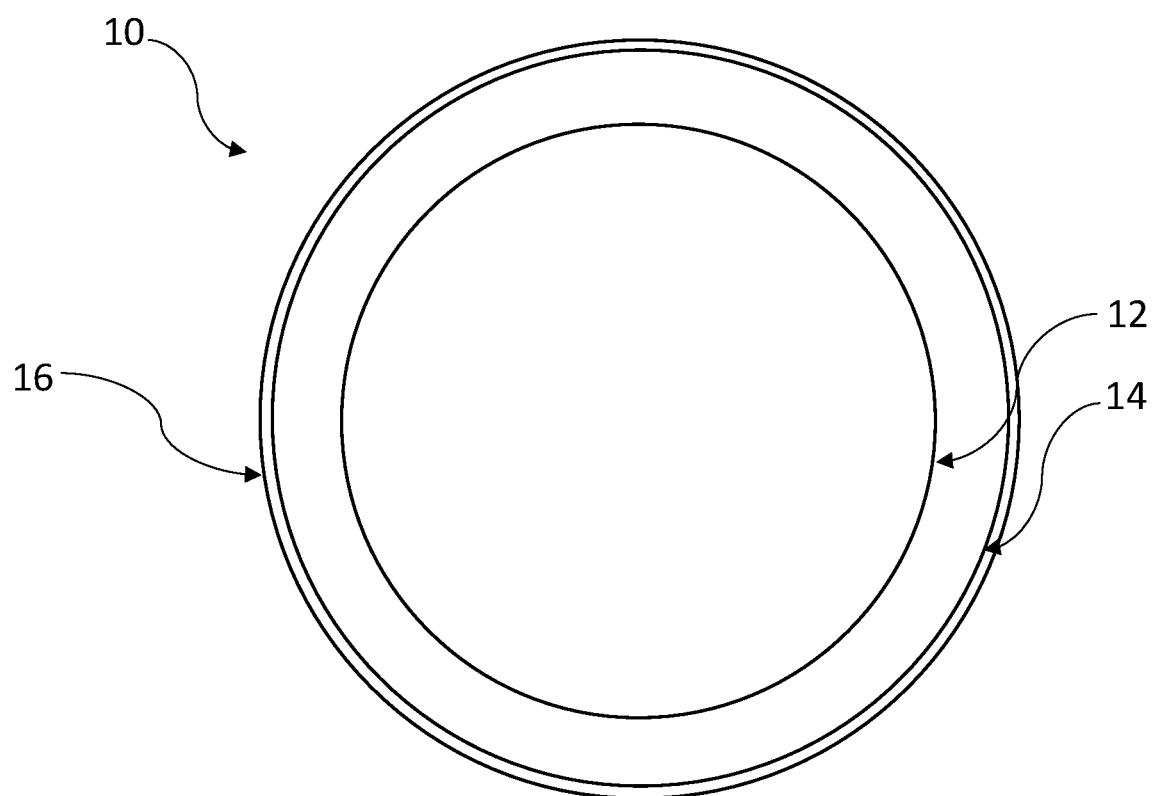
FIG. 1 is a cross-sectional view of a three-piece golf ball in accordance with an embodiment of the present disclosure.

The present disclosure relates to thermoplastic and thermoset polyurethane compositions for use in golf balls. In particular, the compositions of the present disclosure have desirable performance attributes and include non-petroleum-based materials that do not directly compete with food sources. In addition, the compositions use carbon dioxide as a resource rather than releasing it as a global warming emission. The compositions of the present disclosure may be used to form a layer of a golf ball. The compositions and the components and golf balls formed therefrom are discussed in more detail below.

At a high level, the compositions of the present disclosure include organic units joined by urethane. For example, a composition of the present disclosure may include the following urethane linkages:

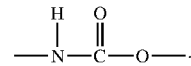

In another aspect, the composition may include urethane linkages and also includes the following urea linkage(s):

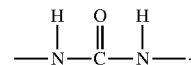

The compositions of the present disclosure, which are segmented copolymers composed of soft and hard segments, may be the reaction product of an isocyanate-containing component (hard segment) and an isocyanate-reactive component (soft segment). In some aspects, the hard segment also includes a chain extender extend the chain length of the polymer and build-up its molecular weight. Without being bound by any particular theory, the use of a chain extender may help to improve the thermal and mechanical properties of the resulting polyurethane composition. As discussed in more detail below, the chain extender may be a single chain-extender or blend of chain-extenders.

In general, the compositions have improved carbon footprints since up to half of the mass of the isocyanate-reactive component is derived from waste $CO_2$ that would otherwise be released to the atmosphere as a greenhouse gas. Moreover, since the compositions incorporate a bio-based isocyanate-reactive component, the compositions have a bio-content of up to 50 percent of the prepolymer backbone. For the purposes of the present disclosure, the term "bio-based" refers to a sustainable, biological, recycled, and/or renewable source. More specifically, a bio-based polymer is referred to as such based on the raw material sources from which the monomers are derived. Similarly, the term "bio-content" is used to describe the carbon atoms from bio-based sources. In this aspect, the bio-content may be determined by ASTM D6866 (Standard Test Methods for Determining the Bio-based Content of Solid, Liquid, and Gaseous Samples Using Radiocarbon Analysis) and described according to the following relationship:

$$\text{Bio} - \text{content} = \frac{C_B}{C_T} \times 100$$

where $C_B$ is the bio (organic) carbon and $C_T$ is the total (organic) carbon. In some aspects, the prepolymer backbone has a bio-content of about 5 percent and 50 percent of the total amount of carbon in the prepolymer backbone. In other aspects, the prepolymer backbone has about 10 percent to about 40 percent bio-content. In still other aspects, the prepolymer backbone has a bio-content of about 8 percent and 35 percent of the total amount of carbon in the prepolymer backbone. In yet other aspects, the prepolymer backbone has about 5 percent to about 25 percent bio-content.

In this regard, as would be understood by those of ordinary skill in the art, the bio-content is affected by the size and nature of the prepolymer backbone and, thus, is also affected by the seed component and co-reactant (both discussed in more detail below). For example, the bio-content of a prepolymer backbone formed with a relatively large seed molecule (e.g., 10000 Mw polypropylene glycol) and co-reactant (such as propylene oxide) may be less than the bio-content of a prepolymer backbone formed with a smaller seed molecule (e.g., ethylene glycol) and a smaller co-reactant (such as ethylene oxide). Likewise, the bio-content of a prepolymer backbone formed with a seed molecule such as propylene glycol and co-reactant (such as propylene oxide) may be greater than the bio-content of a prepolymer backbone formed with a 10000 Mw polypropylene glycol as the seed molecule and propylene oxide as the co-reactant Isocyanate-Reactive Component As briefly discussed above, the isocyanate-reactive component is a bio-based material. In this regard, the isocyanate-reactive component may have a bio-content of greater than about 70 percent of the total amount of carbon in the component. In some embodiments, the isocyanate-reactive component has a bio-content of greater than about 80 percent of the total amount of carbon in the component. In other embodiments, the isocyanate-reactive component has a bio-content of greater than about 90 percent of the total amount of carbon in the component. In still other embodiments, the isocyanate-reactive component has a bio-content of greater than about 95 percent of the total amount of carbon in the component. For example, the isocyanate-reactive component may have a bio-content of at least about 98 percent, at least about 99 percent, or 100 percent of the total amount of carbon in the component.

The isocyanate-reactive component has at least two functional groups. In this aspect, the isocyanate-reactive component has a backbone with at least two functional groups located at the ends of the backbone. In some embodiments, the isocyanate-reactive component has three functional groups located at ends of the backbone. In other embodiments, the isocyanate-reactive component has four functional groups located at ends of the backbone. In some aspects, the functional groups may be hydroxyl groups. In other aspects, the functional groups may be primary, secondary, or combinations thereof. For example, in one embodiment, the functional groups are primary hydroxyl groups.

In some embodiments, the backbone may include one or more carbonate linkage. In this aspect, structurally, the isocyanate-reactive component may be a linear, aliphatic polyol with a carbonate linkage(s). In some embodiments, the isocyanate-reactive component may be a polycarbonate polyol derived from the copolymerization of one or more oxygen-containing heterocycle and carbon dioxide in the presence of a seed component. The resulting polycarbonate polyol sequesters $CO_2$ directly in its backbone.

Suitable oxygen-containing heterocycles include, but are not limited to, ethylene oxide (oxacyclopropane), 1, 2-propylene oxide, 1,3-propylene oxide (oxacyclobutane), tetrahydrofuran (oxacyclopentane), furan, tetrahydropyran (oxacyclohexane), 4H-pyran, 1, 4-dioxane (1,4-dioxacyclohexane), and combinations thereof.

Seed components include, but are not limited to, compounds containing two or more primary or secondary hydroxyl and/or amine functional groups. In some embodiments, the seed component has at least three primary or secondary hydroxyl and/or amine functional groups. In other embodiments, the seed component has at least four primary or secondary hydroxyl and/or amine functional groups. In some aspects, the seed component contains only hydroxyl functional groups. In other aspects, the seed component contains only amine functional groups.

Nonlimiting examples of suitable hydroxyl-containing seed components include ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol;

trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof.

Nonlimiting examples of suitable amine-containing seed components include, but are not limited to, 3,5-dimethylthio-(2,4- or 2,6-)toluenediamine, or an isomer thereof; 3,5-diethylthio-(2,4- or 2,6-)toluenediamine, or an isomer thereof; 3,5-diethyltoluene-(2,4- or 2,6-)diamine, or an isomer thereof; 4,4'-bis-(sec-butylamino)-diphenylmethane; 1,2- or 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p, p'-methylene dianiline; phenylenediamine; 3,3'-dichloro-4,4'-diamino-diphenylmethane (i.e., 4,4'-methylene-bis-(2-chloroaniline)); 3,3'-dichloro-2,2',6,6'-tetraethyl-4,4'-diamino-diphenylmethane; 3,3'-diethyl-5,5'-dichloro-4,4'-diamino-diphenylmethane; 3,3',5,5'-tetraethyl-4,4'-diamino-diphenylmethane (i.e., 4,4'-methylene-bis-(2,6-diethylaniline); 3,3'-diethyl-5,5'-dimethyl4,4'-diamino-diphenylmethane (i.e., 4,4'-methylene-bis (2-ethyl-6-methyl-benezeneamine)); 3,3'-dimethyl-4,4'-diamino-diphenylmethane, 3,3'-diethyl-5,5'-dimethyl-4,4'-diamino-diphenylmethane; 2,2',3,3'-tetrachloro-diamino-diphenylmethane; 2,2'-dichloro-3,3',5,5'-tetraethyl-4,4'-diamino-diphenylmethane (i.e., 4,4'-methylene-bis-(3-chloro-2,6-diethylaniline); 2,2',3,3'-tetrachloro-4,4'-diamino-diphenylmethane (i.e., 4,4'-methylene-bis(2,3-dichloroaniline)); N,N,N',N'-tetramethylethylene diamine; N,N,N',N'',N''-pentamethyldiethylene triamine; triethylene tetramine; and combinations thereof. In other embodiments, the backbone may include one or more urethane linkage. In this aspect, structurally, the isocyanate-reactive component may be a linear, aliphatic polyamine with urethane linkage(s). In some embodiments, the isocyanate-reactive component may be a polyurethane polyamine derived from the copolymerization of one or more nitrogen-containing heterocycle and carbon dioxide in the presence of a seed component. The resulting polyurethane polyamine sequesters $CO_2$ directly in its backbone. Non-limiting examples of suitable nitrogen-containing heterocycles include ethylene imine (aziridine), pyridine, pyrrole, pyrroline, pyrrolidine, piperidine, azepine, and combinations thereof. In some embodiments, the nitrogen-containing heterocycle is ethylene imine, pyrrolidine, pyrrole, piperidine, and combinations thereof. The seed component may be any of the seed components previously discussed.

In still another embodiment, the isocyanate-reactive component may be derived from the terpolymerization of a first oxygen- or nitrogen-containing heterocycle, carbon dioxide in the presence of a seed component and an additional monomer. The additional monomer may be N-(2,3-epoxylpropyl)carbazole (NEC), [(2-naphthyloxy)methyl]oxirane (NMO), allyl glycidyl ether (AGE), maleic anhydride (MA), phthalic anhydride (PA), and combinations thereof. Without being bound to any particular theory, the additional monomer may be used to impart stability, strength, or both. For example, ethylene oxide (EO) may be used as the additional monomer in a $CO_2$ and propylene oxide (PO) system to enhance thermal stability.

In this aspect, the additional monomer may be present in an amount of about 1 to about 15 weight percent based on the total weight of the isocyanate-reactive component. In some embodiments, the additional monomer may be present in an amount of about 2 to about 12 weight percent based on the total weight of the isocyanate-reactive component. In other embodiments, the additional monomer may be present in an amount of about 1 to about 10 weight percent based on the total weight of the isocyanate-reactive component. In still other embodiments, the additional monomer may be present in an amount of about 2 to about 8 weight percent based on the total weight of the isocyanate-reactive component.

The polycarbonate backbone may be poly(ethylene carbonate), poly(propylene carbonate), poly(trimethylene carbonate), poly(tetramethylene carbonate), poly(pentamethylene carbonate), poly(butadiene carbonate), poly(pentadiene carbonate), poly(ethylene ether carbonate), and poly (1,2-propylene carbonate-co-ethylene carbonate).

The amine-terminated polyurethane backbone may be poly(ethylene urethane), poly(tetramethylene urethane), poly(butadiene urethane), and poly(pentamethylene urethane).

Without being bound by any particular theory, since $CO_2$ is a symmetrical linear nonpolar molecule containing two orthogonal π orbital bonds, it is chemically stable, and hard to be activated. Thus, in some embodiments, the copolymerization involves at least one catalyst to activate the inherently inactive $CO_2$. In this aspect, suitable $CO_2$-activating catalysts include, but are not limited to, heterogeneous and homogeneous metal-containing complexes where the metal is zinc (Zn), cobalt (Co), chromium (Cr), magnesium (Mg), iron (Fe), titanium (Ti), aluminum (Al), and combinations thereof. Nonlimiting examples of heterogeneous metal-containing complexes where the metal is Zn include zinc glutarate, zinc dicarboxylate (ZnGA), ZnGA supported on silicon dioxide (ZnGA-SiO2), ZnGA distributed on the surface of acid-treated montmorillonite (MMT) (ZnGA-MMT), ZnGA supported on a perfluorinated compound containing 7-12 carbons (ZnGA-PFC), ZnGA/DMAPM, zinc adipate (ZnAA), ZnGA/4,4'methylenebis (N,N-dimethylaniline) (ZnAA/DMAPM), zinc pimelate (ZnPA), and combinations thereof. Nonlimiting examples of homogeneous metal-containing catalysts where the metal is Zn include zinc phenol hydroxyl complex catalysts, zinc metallophthalocyanine-containing poly (arylene ether sulfone) (Zn-PAE), and combinations thereof.

The $CO_2$-activating catalyst is preferably added in an amount sufficient to activate the $CO_2$. In one embodiment, the catalyst is present in an amount from about 0.001 percent to about 1 percent by weight of the composition. In another embodiment, the catalyst is present in an amount of about 0.1 to 0.5 percent by weight of the composition.

The mechanical and thermal properties of the isocyanate-reactive component of the present disclosure depend on the backbone and side chains. For example, the use of a long chain epoxide may result in a polycarbonate polyol with a Tg below room temperature. Conversely, isocyanate-reactive components derived from cyclohexene oxide and carbon dioxide have a much higher Tg, i.e., over about 212°F. As such, isocyanate-reactive components as disclosed herein not only provide a more environmentally-friendly option (as compared to a petroleum-based polyol), they also provide flexibility to modify/tailor the properties of the resulting polyurethane as desired.

In some embodiments, the isocyanate-reactive component is a blend of a bio-based isocyanate-reactive component and a non-bio-based polyol. For example, the isocyanate-reactive component may include about 10 percent to about 100 percent by weight of bio-based isocyanate-reactive component. In some embodiments, the isocyanate-reactive component may include about 20 percent to about 100 percent by weight of bio-based isocyanate-reactive component. In other embodiments, the isocyanate-reactive component may include about 30 percent to about 100 percent by weight of bio-based isocyanate-reactive component. In still other embodiments, the isocyanate-reactive component may include about 40 percent to about 100 percent by weight of bio-based isocyanate-reactive component.

In this regard, suitable polyols include, but are not limited to, polyether polyols, hydroxy-terminated polybutadiene (including partially/fully hydrogenated derivatives), polyester polyols, polycaprolactone polyols, polycarbonate polyols, and acrylic polyols. In one embodiment, the polyol includes a polyether polyol such as polyoxytetramethylene glycol (PTMEG), polyoxyethylene glycol (PEG), polyethylene propylene glycol, polyoxypropylene glycol (PPG), and mixtures thereof.

Isocyanate-Containing Component

Suitable isocyanate-containing components may be aromatic or aliphatic in nature and contain two or more isocyanate functional groups. The isocyanate-containing component can be a monomer or monomeric unit because it can be polymerized to produce polymeric isocyanates containing two or more monomeric isocyanate repeat units. The isocyanate-containing component may have any suitable backbone chain structure including saturated or unsaturated, and linear, branched, or cyclic.

Nonlimiting examples of isocyanate-containing components include 4,4'-diphenylmethane diisocyanate ("MDI"), polymeric MDI, carbodiimide-modified liquid MDI, 4,4'-dicyclohexylmethane diisocyanate ("$H_{12}$MDI"), p-phenylene diisocyanate ("PPDI"), toluene diisocyanate ("TDI"), 3,3'-dimethyl-4,4'-biphenylene diisocyanate ("TODI"), polymeric methylene diphenyl diisocyanate ("PMDI"), m-phenylene diisocyanate ("PDI"), isophorone diisocyanate ("IPDI"), hexamethylene diisocyanate ("HDI"), naphthalene diisocyanate ("NDI"), xylene diisocyanate ("XDI"), p-methylxylene diisocyanate, m-methylxylene diisocyanate, o-methylxylene diisocyanate, para-tetramethylxylene diisocyanate ("p-TMXDI"), meta-tetramethylxylene diisocyanate ("m-TMXDI"), ethylene diisocyanate, propylene-1,2-diisocyanate, tetramethylene-1,4-diisocyanate, cyclohexyl diisocyanate, 1,6-hexamethylene-diisocyanate ("HDI"), dodecane-1,12-diisocyanate, cyclobutane-1,3-diisocyanate, cyclohexane-1,3-diisocyanate, cyclohexane-1,4-diisocyanate, trans-cyclohexane diisocyanate (CHDI), 1-isocyanato-3,3,5-trimethyl-5-isocyanatomethylcyclohexane, methyl cyclohexylene diisocyanate, triisocyanate of HDI, triisocyanate of 2,4,4-trimethyl-1,6-hexane diisocyanate ("TMDI"), tetracene diisocyanate, naphthalene diisocyanate ("NDI"), anthracene diisocyanate, and homopolymers and copolymers and combinations thereof. In one embodiment, the isocyanate-containing component is selected from MDI, PPDI, TDI, and combinations thereof. In another embodiment, the isocyanate-containing component includes MDI. Suitable multifunctional isocyanates include, but are not limited to, trimers of HDI or $H_{12}$MDI, oligomers, or other derivatives thereof. It should be understood that, as used herein, the term "MDI" includes 4,4'-diphenylmethane diisocyanate, polymeric MDI, carbodiimide-modified liquid MDI, $H_{12}$MDI, and combinations thereof.

Reaction Product

Compositions of the present disclosure may be produced via a "one-step" approach or a "two-step" prepolymer approach. More specifically, in some embodiments, the isocyanate-reactive component and the isocyanate-containing component are mixed and reacted simultaneously with a chain extender. In other embodiments, the isocyanate-containing component and isocyanate-reactive component are reacted first to form a prepolymer, followed by chain extension. Suitable chain extenders are discussed below.

Chain Extender

In this aspect, the chain length of the prepolymer may be extended by reacting it with a chain extender. The chain extender may be any aliphatic or aromatic compound containing two or more primary or secondary hydroxyl and/or amine functional groups. The chain extender may have any suitable backbone chain structure including saturated or unsaturated, and linear, branched, or cyclic.

In some embodiments, the chain extender may be hydroxy-terminated. In this aspect, suitable hydroxy-terminated chain-extenders may include, but are not limited to, short chain or long chain polyols. Suitable hydroxy-terminated chain extenders include, but are not limited to ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-2,3-butanediol; 2,3-dimethyl-2,3-butanediol; butanediol; 1,3-butanediol; 1,4-butanediol; cyclohexyldimethylol; triisopropanolamine; N,N,N',N'-tetra-(2-trimethylolpropane; hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof.

In other embodiments, the chain extender may be amine-terminated. Suitable amine-terminated chain extenders include, but are not limited to, 3,5-dimethylthio-(2,4- or 2,6-) toluenediamine, or an isomer thereof; 3,5-diethylthio-(2,4- or 2,6-)toluenediamine, or an isomer thereof; 3,5-diethyltoluene-(2,4- or 2,6-)diamine, or an isomer thereof; 4,4'-bis-(sec-butylamino)-diphenylmethane; 1,2- or 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p, p'-methylene dianiline; phenylenediamine; 3,3'-dichloro-4,4'-diamino-diphenylmethane (i.e., 4,4'-methylene-bis-(2-chloroaniline)); 3,3'-dichloro-2,2',6,6'-tetraethyl-4,4'-diamino-diphenylmethane; 3,3'-diethyl-5,5'-dichloro-4,4'-diamino-diphenylmethane; 3,3',5,5'-tetraethyl-4,4'-diamino-diphenylmethane (i.e., 4,4'-methylene-bis-(2,6-diethylaniline); 3,3'-diethyl-5,5'-dimethyl4,4'-diamino-diphenylmethane (i.e., 4,4'-methylene-bis(2-ethyl-6-methyl-benezeneamine)); 3,3'-dimethyl-4,4'-diamino-diphenylmethane, 3,3'-diethyl-5,5'-dimethyl-4,4'-diamino-diphenylmethane; 2,2',3,3'-tetrachloro-diamino-diphenylmethane; 2,2'-dichloro-3,3',5,5'-tetraethyl-4,4'-diamino-diphenylmethane (i.e., 4,4'-methylene-bis-(3-chloro-2,6-diethylaniline); 2,2',3,3'-tetrachloro-4,4'-diamino-diphenylmethane (i.e., 4,4'-methylene-bis(2,3-dichloroaniline)); N,N,N',N''-tetramethylethylene diamine; N,N,N',N'',N''-pentamethyldiethylene triamine; triethylene tetramine; and combinations thereof. In some embodiments, the chain extender is a primary amine. In other embodiments, the chain extender is a secondary amine.

Additives

The compositions of the present disclosure may also include fillers, additives, and other ingredients that do not detract from (and possibly enhance) the properties of the final composition. These additional materials include, but are not limited to, catalysts, wetting agents, coloring agents, optical brighteners, cross-linking agents, whitening agents such as titanium dioxide and zinc oxide, ultraviolet (UV) light absorbers, hindered amine light stabilizers, defoaming agents, processing aids, surfactants, and other conventional additives. Other suitable additives include antioxidants, stabilizers, softening agents, plasticizers, including internal and external plasticizers, impact modifiers, foaming agents, density-adjusting fillers, reinforcing materials, compatibilizers, and the like. Some examples of useful fillers include zinc oxide, zinc sulfate, barium carbonate, barium sulfate, calcium oxide, calcium carbonate, clay, tungsten, tungsten carbide, silica, and mixtures thereof. Polymeric, ceramic, metal, and glass microspheres also may be used. Generally, the additives will be present in the composition in an amount between about 1 and about 70 weight percent based on total weight of the composition depending upon the desired properties.

If used, the catalyst is preferably added in an amount sufficient to catalyze the reaction of the components in the reactive mixture. More specifically, a catalyst may be employed to promote the reaction between the isocyanate-containing component and the isocyanate-reactive component for producing the prepolymer or between prepolymer and chain-extender during the chain-extending step. In some embodiments, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The compositions of the present disclosure may be thermoplastic or thermoset. When thermoplastic, there is minimal cross-linking, e.g., any bonding in the polymer network is primarily through hydrogen bonding or other physical mechanism. Because of their lower level of cross-linking, thermoplastic compositions are relatively flexible and the cross-linking bonds can be reversibly broken by increasing temperature such as during molding or extrusion. When thermoset, there is a high level of cross-linking. Because of their high level of cross-linking, thermoset compositions are relatively rigid and the cross-linking bonds are irreversibly set and are not broken when exposed to heat.

In some embodiments, the compositions of the present disclosure have a material hardness of 80 Shore D or less, or 70 Shore D or less, or 60 Shore D or less, or 55 Shore D or less, or 50 Shore D or less, or 45 Shore D or less. It should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material (or, as here, the composition of the present disclosure). Surface hardness as measured directly on a golf ball (or other spherical surface), discussed below, typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240. In other embodiments, the material hardness of the compositions of the present disclosure ranges from about 50 to about 80. In still other embodiments, the material hardness of the compositions of the present disclosure have a Shore D hardness in the range of about 10 to about 70.

The flexural modulus of the compositions of the present disclosure may range from about 1700 psi to about 80,000 psi. In one embodiment, the composition has a flexural modulus of about 1700 psi to about 35,000 psi. In another embodiment, the flexural modulus of the composition ranges from about 10,000 psi to about 75,000 psi. In still another embodiment, the composition has a flexural modulus of about 3000 psi to about 70,000 psi.

Golf Balls

Golf balls formed in accordance with the present disclosure include at least a core and a cover. Without being bound to any particular theory, the polyurethane compositions of the present disclosure are as durable and resilient as conventional elastomeric compositions without any sacrifices of performance or processability. In some embodiments, golf balls formed in accordance with the present disclosure have a cover layer formed from the polyurethane compositions of the present disclosure.

Figure 2:
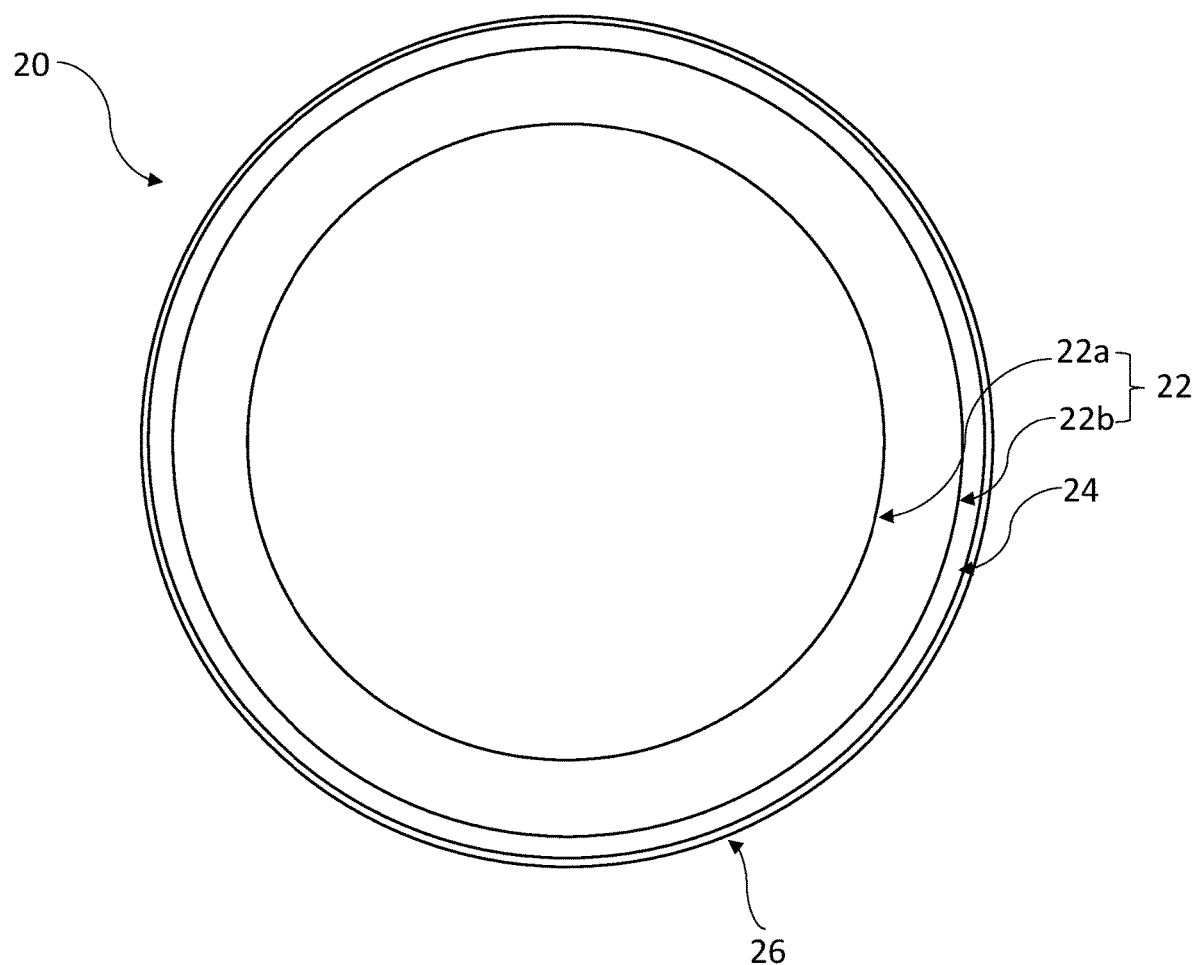
FIG. 2 is a cross-sectional view of a four-piece golf ball in accordance with an embodiment of the present disclosure.
Figure 3:
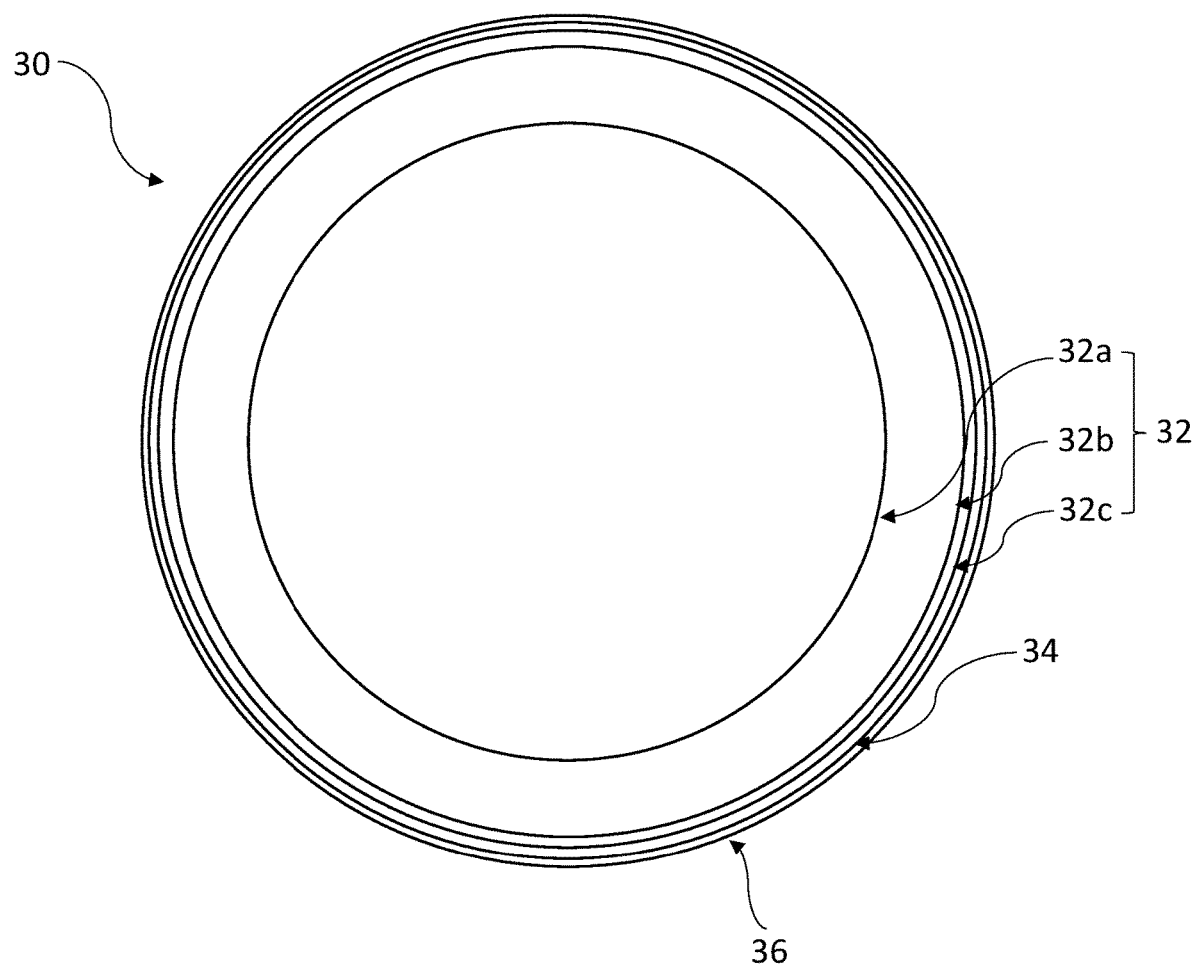
FIG. 3 is a cross-sectional view of a five-piece golf ball in accordance with an embodiment of the present disclosure.

Referring to FIG. 1, in one version, a three-piece golf ball 10 can be made in accordance with the present disclosure. The ball 10 contains a core 12, a cover 16, and an optional layer 14 disposed between the core 12 and the cover 16. Referring to FIG. 2, in one version, a four-piece golf ball 20 can be made in accordance with this invention. The ball 20 contains a center 22, an outer core layer 24, a cover 28, and a layer 26 disposed between the outer core layer and the cover 28. Referring to FIG. 3, in another version, a five-piece golf ball 30 contains a core 32 including a center 32*a*, an outer core layer 32*c*, and an inner core layer 32*b* disposed between the center 32*a* and the outer core layer 32*c*, a cover 36, and a layer 34 disposed between the core 32 and the cover 36. In any of these embodiments, the layer 14, 26, and 34 may be considered an intermediate layer, casing or mantle layer, or inner cover layer, or any other layer disposed between the core assemblage and the outer cover of the ball. In any of these embodiments, the cover 16, 28, or 36 may be formed from a polyurethane composition of the present disclosure. In the alternative, in any of these embodiments, the layer 14, 26, or 34 may be formed from a polyurethane composition of the present disclosure.

Golf balls made in accordance with this invention can be of any size, although the USGA requires that golf balls used in competition have a diameter of at least 1.68 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches. There is no upper limit so many golf balls have an overall diameter falling within the range of about 1.68 to about 1.80 inches. In this regard, golf balls made in accordance with this invention have a diameter in the range of about 1.68 to about 1.80 inches. In one embodiment, the golf ball diameter is about 1.68 to 1.74 inches. In another embodiment, the golf ball diameter is about 1.68 to 1.70 inches. For play outside of United States Golf Association (USGA) rules, the golf balls can be of a smaller size. In one embodiment, golf balls made in accordance with this invention have a diameter in the range of about 1.68 inches or less, e.g., 1.55 inches to about 1.68 inches.

The core of a golf ball formed in accordance with the present disclosure may include a solid sphere or a center and at least one core layer disposed thereon. Core components may be formed from a rubber formulation. In one embodiment, the rubber formulation includes a base rubber in an amount of about 5 percent to 100 percent by weight based on total weight of formulation. In one embodiment, the base rubber is included in the rubber formulation in an amount within a range having a lower limit of about 5 percent or 10 percent or 20 percent or 30 percent or 40 percent or 50 percent and an upper limit of about 55 percent or 60 percent or 70 percent or 80 percent or 90 percent or 95 percent or 100 percent. For example, the base rubber may be present in the rubber formulation in an amount of about 40 percent to about 95 percent by weight based on the total weight of the formulation. In one embodiment, the rubber formulation includes about 55 percent to about 95 percent base rubber based on the total weight of the formulation.

The base rubber may be polybutadiene, polyisoprene, ethylene propylene rubber, ethylene-propylene-diene rubber, styrene-butadiene rubber, styrenic block copolymer rubbers, polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. In one embodiment, the rubber formulation includes polybutadiene rubber, butyl rubber, or a blend thereof as the base rubber.

The rubber formulations further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. In one embodiment, the co-agent is one or more metal salts of acrylates, diacrylates, methacrylates, and dimethacrylates, wherein the metal is selected from magnesium, calcium, zinc, aluminum, lithium, and nickel. In another embodiment, the co-agent includes one or more zinc salts of acrylates, diacrylates, methacrylates, and dimethacrylates. For example, the co-agent may be zinc diacrylate (ZDA). In another embodiment, the co-agent may be zinc dimethacrylate (ZDMA).

The co-agent may be included in the rubber formulation in varying amounts depending on the specific core component for which the rubber formulation is intended. In one embodiment, the amount of co-agent used in the rubber formulations increases for each outer component of the core assemblage. In other words, the co-agent in the rubber formulation for the center is included in a first amount and the co-agent in the rubber formulation for the outer core layer is included in a second amount. The second amount may be more than the first amount. In this aspect, the first amount may be about 25 percent to about 90 percent of the second amount. For example, the first amount may be about 40 percent to about 80 percent of the second amount. In one embodiment, the first amount is about 60 percent to about 75 percent of the second amount.

Radical scavengers such as a halogenated organosulfur, organic disulfide, or inorganic disulfide compounds may also be added to the rubber formulation. In one embodiment, a halogenated organosulfur compound included in the rubber formulation includes, but is not limited to, pentachlorothiophenol (PCTP) and salts of PCTP such as zinc pentachlorothiophenol (ZnPCTP). In another embodiment, ditolyl disulfide, diphenyl disulfide, dixylyl disulfide, 2-nitroresorcinol, and combinations thereof are added to the rubber formulation.

The rubber formulation may be cured using conventional curing processes. Non-limiting examples of curing processes suitable for use in accordance with the present invention include peroxide-curing, sulfur-curing, high-energy radiation, and combinations thereof. In one embodiment, the rubber formulation includes a free-radical initiator selected from organic peroxides, high energy radiation sources capable of generating free-radicals, and combinations thereof. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators may be present in the rubber formulation in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The core diameter may range from about 1.50 inch to about 1.60 inch. In one embodiment, the core has a diameter of about 1.52 inch to about 1.58 inch. In another embodiment, the core diameter ranges from about 1.54 inch to about 1.56 inch.

When the cover of a golf ball formed in accordance with the present disclosure is not formed of a polyurethane composition of the present disclosure, such layer(s) may be formed from a variety of materials may be used for forming the cover including, for example, conventional polyurethanes and polyureas; copolymers, blends and hybrids of conventional polyurethane and polyurea; olefin-based copolymer ionomer resins; polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and; cross-linked transpolyisoprene and blends thereof; polyester-based thermoplastic elastomers; polyurethane-based thermoplastic elastomers; synthetic or natural vulcanized rubber; and combinations thereof.

Likewise, when the layer disposed between the core and the cover (if included) is not formed of a polyurethane composition of the present disclosure, conventional and non-conventional materials may be used for forming such layer(s) of the ball including, for instance, ionomer resins, highly neutralized polymers, polybutadiene, butyl rubber, and other rubber-based core formulations, and the like. In this aspect, ionomers suitable for use in accordance with the present disclosure may include partially neutralized ionomers and highly neutralized ionomers (HNPs), including ionomers formed from blends of two or more partially neutralized ionomers, blends of two or more highly neutralized ionomers, and blends of one or more partially neutralized ionomers with one or more highly neutralized ionomers. For purposes of the present disclosure, "HNP" refers to an acid copolymer after at least 70 percent of all acid groups present in the composition are neutralized.

Suitable ionomers may be salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X may be selected from methacrylic acid, acrylic acid, ethacrylic acid, crotonic acid, and itaconic acid, Y may be selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Nonlimiting examples of O/X and O/X/Y-type copolymers include ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like.

"Low acid" and "high acid" ionomeric polymers, as well as blends of such ionomers, may be used. In general, low acid ionomers are considered to be those containing 16 weight percent or less of acid moieties, whereas high acid ionomers (e.g., Surlyn® 8150) are considered to be those containing greater than 16 weight percent of acid moieties. In one embodiment, the inner cover layer is formed from a composition comprising a high acid ionomer. In another embodiment, the inner cover layer is formed from a composition comprising a high acid ionomer and a maleic anhydride-grafted non-ionomeric (e.g., Fusabond® 525D (Dow)). Blends of high acid ionomers with maleic anhydride-grafted polymers are further disclosed, for example, in U.S. Pat. Nos. 6,992,135 and 6,677,401, the entire disclosures of which are hereby incorporated herein by reference.

Any of the layers of a golf ball formed in accordance with the present disclosure may include a variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents such as pigments and dyes, fluorescent agents, whitening agents, UV absorbers, light stabilizers, surfactants, processing aids, antioxidants, stabilizers, softening agents, chemical blowing and foaming agents, defoaming agents, fragrance components, plasticizers, wetting agents, impact modifiers, antiozonants, titanium dioxide, clay, mica, talc, glass flakes, milled glass, and mixtures thereof.

The outermost cover layer preferably has a material hardness of 85 Shore C or less. The thickness of the outermost cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail herein. When included, the inner cover layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches.

In one embodiment, the golf balls made in accordance with the present disclosure include a core as described herein, a layer disposed on the core formed from an ionomeric material, and a cover formed from a polyurethane composition of the present disclosure, and the cover has a hardness that is less than that of the layer disposed between the core and the cover. For example, the layer disposed between the core and the cover may have a hardness of greater than about 60 Shore D and the cover may have a hardness of less than about 60 Shore D.

In some aspects, when the layer(s) disposed between the core and the cover is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In an alternative embodiment, the layer disposed between the core and the cover is formed of a polyurethane composition of the present disclosure and the cover is formed of an ionomeric material. In this alternative embodiment, the layer disposed between the core and the cover may have a hardness of less than about 60 Shore D and the cover may have a hardness of greater than about 55 Shore D and the layer disposed between the core and the cover has a hardness that is less than the cover hardness.

When a dual cover is disposed about the core, the layer disposed between the core and the cover may have a thickness of about 0.01 inches to about 0.1 inches, about 0.015 inches to about 0.08 inches, or about 0.02 inches to about 0.05 inches. The cover may have a thickness of about 0.015 inches to about 0.055 inches, about 0.02 inches to about 0.04 inches, or about 0.025 inches to about 0.035 inches.

A golf ball formed in accordance with the present disclosure has a Coefficient of Restitution (CoR) of at least 0.750 and more preferably at least 0.800 (as measured per the test methods below). Such COR allows players to generate greater ball velocity off the tee and achieve greater distance with their drives. At the same time, a golf ball including a cover or an inner cover formed of a thermoplastic elastomer composition of the present disclosure means that a player will have a more comfortable and natural feeling when striking the ball with a club. Furthermore, such golf balls have good shear durability and mechanical strength.

The shear durability of a golf ball of the present disclosure, which is manifest as the ability of a golf ball to maintain its mechanical stability and integrity upon the application of a shear stress to that golf ball, is preferably comparable or greater than a golf ball formed with a conventional thermoplastic polyurethane cover. As shown in Table 1 below, a "shear durability rating" is a qualitative, or relative, scale that incorporates shear mode (i.e., cut/damaged cover, abrasion type damage, and/or paint damage) and severity and weighs them accordingly to make ratings/scores averageable and errors less impactful of overall scores into a scale.

TABLE 1

Shear Durability Rating Scale

| Rating | Cut/Damaged Cover | Abrasion Type Damage | Paint Damage |
|---|---|---|---|
| 1 | Cut or Cracked Cover with casing layer exposed | | |
| 2 | Severe cover damage with multiple groove marks and deep gouges | | |
| 3 | Moderate cover damage with more than one groove mark, | | |

TABLE 1-continued

Shear Durability Rating Scale

| Rating | Cut/Damaged Cover | Abrasion Type Damage | Paint Damage |
|---|---|---|---|
| | missing or severely raised cover material | | |
| 4 | Moderate cover damage with one larger or several smaller groove mark, raised cover material | Severe abrasion damage, quarter sized are of planed off frets with noticeably altered dimples | |
| 5 | Slight cover damage of one or two groove marks with cover that is cut but not raised or one or two very small, raised pieces | Moderate to severe abrasion with multiple groove marks of removed fret areas, slightly noticeable dimple changes | |
| 6 | Very slight cover damage with one small area of cut cover, but not raised. Sand impregnation | Moderate abrasion damage. Frets are planed off in small dime sized area or one larger (3-4 dimples long) groove mark | Severe paint failure with missing paint on a quarter sized area or greater |
| 7 | | Abrasion of a dime sized area with no major alteration of fret areas | More severe paint damage with missing paint on two or more groove marks |
| 8 | | Minor scratches and abrasion of paint and possible cover abrasion | Moderate paint damage. One to two longer (3-4 dimples long) groove marks with interrupted paint or one groove mark with missing paint only |
| 9 | | | Slight paint damage with only one larger or several smaller groove mark of interrupted paint |
| 10 | | | No damage |

In other words, the higher the shear durability rating is, the higher the shear durability of the material. The shear durability rating above can be determined by using a mechanical golf swing machine where one hit is made on each of about 6 to 12 substantially identical golf balls of substantially the same composition with either a sand wedge or a pitching wedge. After a suitable calibration procedure, each experimental golf ball may be tested and assigned a rating based upon visible manifestations of damage after being struck. The shear durability rating for a golf ball with a particular cover represents a numerical average of all the tested substantially identical golf balls. An alternative way to test shear resistance of a golf ball cover involves using player-testing and evaluating the results after the ball is struck multiple times with wedges and/or short irons.

In one embodiment, a golf ball formed in accordance with the present disclosure, i.e., with a cover layer formed of a polyurethane composition as disclosed herein, has a shear durability rating of at least 6. In another embodiment, the shear durability of a golf ball formed in accordance with the present disclosure is at least 7. In still another embodiment, a golf ball formed in accordance with the present disclosure, i.e., with a cover layer formed of a thermoplastic elastomer composition as disclosed herein, has a shear durability rating of at least 8. In some aspects, the shear durability of a golf ball formed in accordance with the present invention, i.e., with a cover formed of a polyurethane composition as disclosed herein, is comparable to or better than a golf ball with a conventional polyurethane cover (holding all of the other ball components constant).

The golf balls of the present disclosure may be formed using a variety of application techniques. For example, the golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials.

In this aspect, different molding operations may be used to form a layer of the golf ball using the compositions of the present disclosure. For example, compression-molding, casting, and injection-molding processes can be used. In some embodiments, the polyurethane compositions of the present disclosure are cast. More particularly, in such an embodiment, the prepolymer and curing agent can be mixed in a motorized mixer inside a mixing head by metering amounts of the curative and prepolymer through the feed lines. Preheated lower mold cavities may be filled with the reactive prepolymer and curing agent mixture. Likewise, the preheated upper mold cavities can be filled with the reactive mixture. The lower and upper mold cavities are filled with substantially the same amount of reactive mixture. After the reactive mixture has resided in the lower mold cavities for a sufficient time period, typically about 40 to about 100 seconds, the golf ball subassembly can be lowered at a controlled speed into the reacting mixture. Ball cups can hold the subassemblies by applying reduced pressure (or partial vacuum). After sufficient gelling (typically about 4 to about 12 seconds), the vacuum can be removed and the subassembly can be released. Then, the upper half-molds can be mated with the lower half-molds. An exothermic reaction occurs when the polyurethane prepolymer and curing agent are mixed and this continues until the material solidifies around the subassembly. The molded balls can then be cooled in the mold and removed when the molded cover layer is hard enough to be handled without deforming. Such molding techniques are explained in more detail in U.S. Pat. Nos. 6,132,324, 5,334,673 and 5,006,297, the disclosures of which are hereby incorporated by reference.

In other embodiments, the compositions of the present disclosure (in thermoplastic pellets) are molded into a layer using retractable pin injection-molding (RPIM) methods. In this aspect, upper and lower mold cavities may be mated together. The upper and lower mold cavities form a spherical interior cavity when they are joined together. If an outer cover layer, the mold cavities used to form the layer have interior dimple cavity details. The cover material conforms to the interior geometry of the mold cavities to form a dimple pattern on the surface of the ball. The injection-mold includes retractable support pins positioned throughout the mold cavities. The retractable support pins move in and out of the cavity. The support pins help maintain the position of the core or ball sub-assembly while the molten composition flows through the mold gates. The molten composition flows into the cavity between the core and mold cavities to surround the core and form the cover layer.

Golf balls made in accordance with the present disclosure may be subjected to finishing steps such as flash-trimming, surface-treatment, marking, coating, and the like using techniques known in the art. In some embodiments, prior to forming the cover layer, the ball subassembly may be surface-treated to increase the adhesion between its outer surface and cover material. Examples of such surface-treatment may include mechanically or chemically abrading the outer surface of the subassembly. In addition, the subassembly may be subjected to corona discharge, plasma treatment, silane dipping, or other chemical treatment methods known to those of ordinary skill in the art prior to forming the cover around it. Other layers of the ball, for example, the core and cover layers, also may be surface-treated. Examples of these and other surface-treatment techniques can be found in U.S. Pat. No. 6,315,915, the disclosure of which is hereby incorporated by reference.

Indicia such as trademarks, symbols, logos, letters, and the like may be printed on the cover using pad-printing, ink-jet printing, dye-sublimation, or other suitable printing methods. Clear surface coatings (for example, primer and top-coats), which may contain a fluorescent whitening agent, may be applied to the cover. Golf balls may also be painted with one or more paint coatings in a variety of colors. In one embodiment, white primer paint is applied first to the surface of the ball and then a white topcoat of paint may be applied over the primer.

EXAMPLES

The following examples illustrate golf balls formed in accordance with the present disclosure.

Examples 1: Bio-Based Polyol Vs. PTMEG 2000

Control cover formulation A was made with PTMEG 2000 and isocyanate. Cover formulations made in accordance with the present disclosure (Examples 1-8) were made with a bio-based isocyanate-reactive component and isocyanate-containing component. Each cover formulation was made with a two-step prepolymer approach with target NCO content of 5.5 percent. The specific amounts of each component are shown in Table 2 below.

TABLE 2

Polyurethane Compositions

| Example | Isocyanate | Isocyanate-Reactive Component | Actual NCO Content |
|---|---|---|---|
| A (Control) | Control[1] | | 5.64 |
| 1 | 70% Desmodur W/30% Desmodur N-3400 | PTMEG 2000 | 5.74 |
| 2 | | 90% PTMEG/10% BB-P1[2] | 5.91 |
| 3 | | 80% PTMEG/20% BB-P1 | 5.79 |
| 4 | | 60% PTMEG/40% BB-P1 | 5.42 |
| 5 | 70% Desmodur W/30% Desmodur N-3400 | BB-P2[3] | 5.57 |
| 6 | | 90% PTMEG/10% BB-P2 | 5.40 |
| 7 | | 80% PTMEG/20% BB-P2 | 5.47 |
| 8 | | 60% PTMEG/40% BB-P2 | 5.48 |

[1]5.5% NCO 70/30 Desmodur W/Desmodur N-3400 with PTMEG 2000
[2]1000 m.w. hydroxyl-terminated diols produced from propylene oxide and carbon dioxide (Converge CPX-2012-112)
[3]2000 m.w. hydroxyl-terminated diols produced from propylene oxide and carbon dioxide (Converge CPX-2520-56)

A thin cover formed from the cover formulations in Table 1 above were cast onto primer-sprayed subassemblies (including a rubber core with an ionomer layer disposed thereon). Each of Examples 1-8 performed well versus the Control A in shear testing as described above with respect to Table 1. No cuts were evident upon visual inspection and, thus, all balls were rated between a 7 and a 10. Cover hardness data indicates that Examples 5-8 delivered higher cover hardness than Control A.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A golf ball, comprising:
   a core; and
   a cover, wherein the cover is formed from a composition comprising a reaction product of an isocyanate-reactive component and an isocyanate-containing component, wherein the isocyanate-reactive product comprises a precursor reaction product of at least one oxygen-containing heterocycle and carbon dioxide in the presence of a seed component, wherein the seed component comprises two or more primary or secondary hydroxyl and/or amine functional groups.

2. The golf ball of claim 1, wherein the isocyanate-reactive component comprises about 20 percent to about 100 percent of the precursor reaction product.

3. The golf ball of claim 2, wherein the isocyanate-reactive component comprises about 40 percent to about 100 percent of the precursor reaction product.

4. The golf ball of claim 1, wherein the isocyanate-reactive component consists essentially of the precursor reaction product.

5. The golf ball of claim 1, wherein the reaction product further comprises a chain extender.

6. The golf ball of claim 1, wherein the oxygen-containing heterocycle comprises propylene oxide and the seed component comprises polypropylene glycol or propylene glycol.

7. The golf ball of claim 1, wherein the precursor reaction product comprises two primary functional hydroxyl groups at each end of a polycarbonate backbone.

8. The golf ball of claim 1, further comprising a layer disposed between the core and the cover.

9. The golf ball of claim 8, wherein the layer comprises an ionomer material.

10. A golf ball, comprising:
a core; and
a cover, wherein the cover is formed from a composition comprising a second reaction product of a prepolymer and a chain extender, wherein the composition comprises urethane linkages, wherein the prepolymer comprises a first reaction product of an isocyanate-reactive component and an isocyanate-containing component, wherein the isocyanate-reactive product comprises two primary functional hydroxyl groups at each end of a polycarbonate backbone, and wherein the isocyanate-reactive product is a precursor reaction product of at least one oxygen-containing heterocycle and carbon dioxide in the presence of a seed component, wherein the seed component comprises two or more primary or secondary hydroxyl and/or amine functional groups.

11. The golf ball of claim 10, wherein the oxygen-containing heterocycle comprises propylene oxide and the seed component comprises polypropylene glycol or propylene glycol.

12. The golf ball of claim 10, wherein the precursor reaction product further comprises a catalyst present in an amount sufficient to activate the carbon dioxide.

13. The golf ball of claim 12, wherein the catalyst comprises zinc glutarate, zinc dicarboxylate (ZnGA), ZnGA supported on silicon dioxide (ZnGA-SiO2), ZnGA distributed on the surface of acid-treated montmorillonite (MMT) (ZnGA-MMT), ZnGA supported on a perfluorinated compound containing 7-12 carbons (ZnGA-PFC), ZnGA/DMAPM, zinc adipate (ZnAA), ZnGA/4,4'methylenebis (N,N-dimethylaniline) (ZnAA/DMAPM), zinc pimelate (ZnPA), or combinations thereof.

14. The golf ball of claim 12, wherein the catalyst comprises zinc phenol hydroxyl complex catalysts, zinc metallophthalocyanine-containing poly (arylene ether sulfone) (Zn-PAE), or combinations thereof.

15. A method of forming a golf ball, comprising the steps of:
providing a golf ball sub-assembly comprising at least one core layer;
forming a first reaction product from carbon dioxide and an oxygen-containing heterocycle, wherein the first reaction product comprises a carbonate backbone with primary hydroxyl groups at each end of the backbone;
adding an isocyanate-containing component to the first reaction product to form a second reaction product comprising urethane linkages; and
forming a cover disposed about the sub-assembly, the cover comprising the second reaction product.

16. The method of claim 15, wherein the step of forming a first reaction product comprises reacting carbon dioxide with an oxygen-containing heterocycle in the presence of a seed component.

17. The method of claim 15, wherein the step of adding further comprises the step of adding a chain extender.

18. The method of claim 17, wherein the chain extender is hydroxy-terminated, amine-terminated, or a combination thereof.

* * * * *